Patented Nov. 4, 1952

2,616,826

UNITED STATES PATENT OFFICE 2,616,826

BLOOD PLATELET COUNT INFLUENCING FACTORS PREPARATION

Sylvan E. Moolten, New York, N. Y., assignor to American Cholesterol Products, Inc., a corporation of New York No Drawing. Application September 6, 1945, Serial No. 614,819

8 Claims. (Cl. 167—74)

The present invention relates to biologically active extracts of animal materials and is more particularly concerned with extractive substances which influence the blood platelet count and with methods for their preparation from raw animal materials.

It has heretofore been recognized that the spleen exerts some influence on the level of the blood thrombocytes. *Thrombocytopenic purpura*, which is accompanied by a marked lowering of the thrombocyte count, has been alleviated by splenectomy, which would suggest the production in the spleen of a thrombocyte-lowering factor or principle. Extracts of animal spleens have been prepared in the past and their effect on the thrombocyte level investigated. Concentrates formed by extraction of thrombocytopenic purpura spleens with acetone have been found by some observers to exert a significant thrombocyte-reducing influence. Other observers later partly corroborated this result, although to a less striking degree; other investigators, however, obtained negative or paradoxical results, employing for the most part the same extractive procedure. The net results of the reported findings along this line are confusing.

The desirability of clarification of knowledge in this field is apparent and it is also much to be desired that extracts could be prepared which would consistently give the same physiological effects on the blood platelet count when administered to the living animal.

I have discovered the existence of a thrombocyte-increasing principle or factor, i. e., a factor whose physiological action is antagonistic to that of the spleen extracts heretofore prepared, and have devised an effective process by which this factor may be concentrated to produce physiologically potent extracts. I have also demonstrated the existence of the thrombocyte-reducing principle and have succeeded in providing a reliable procedure by which concentrates of this substance may be obtained consistently from raw animal materials. The present invention affords reliable techniques for the differential concentration or extraction of these two antagonistic physiologically active materials, whereby either one or both of them may be consistently recovered in highly concentrated form. I have denominated the hitherto unknown thrombocyte-increasing factor "thrombocytosin" and for convenience will use that term hereinafter to designate this factor or substance. Its antagonist which acts to lower the thrombocyte count will be referred to as "thrombocytopen."

Following the development of effective methods of separation of the two antagonistic factors, numerous other materials than spleens were investigated, from which it was discovered that these two factors occur rather widely in various animal tissues. I have found that the reticulo-endothelial tissues are rich in thrombocytosin; the lymph glands and the subcutaneous fat are particularly rich in this factor. It is also found in significant amounts in a number of other tissues. Thrombocytopen occurs in the normal human spleen and in a much greater amount in the spleen of purpura hemorrhagica.

It is an advantage of the present invention that a physiologically active material, derived from material of animal origin, capable of elevating the thrombocyte count in the living animal is provided. A further advantage of the invention lies in the provision of a physiologically potent concentrate which will depress the thrombocyte level when administered to the living animal.

It is an object of the invention to provide an effective process for concentrating the content of blood platelet influencing substances in extracts of animal material and to provide a process for the differential recovery of the different individual substances of this kind.

A further object of the invention is to provide a material which is rich in the thrombocyte-increasing principle. A further object of the invention is to provide a material rich in the thrombocyte-lowering principle and substantially free from the thrombocyte-increasing factor.

A further object of the invention is to provide a reliable process for the differential extraction of thrombocytopen and thrombocytosin present in association in animal materials which will consistently lead to the recovery in concentrated form of either or both substances individually at will.

Extraction of animal spleens with acetone, I have discovered, leads to an extract which contains both a thrombocyte-increasing factor and a thrombocyte-lowering factor. Separation of these individual materials has been accomplished by methods involving concentration by extraction with ether and subsequent fractional solution and fractional crystallization. Methanol is a satisfactory solvent for accomplishing this separation. Thrombocytopen can be demonstrated in the fraction which is less soluble in cold methanol and in the first harvest of crystals obtained from a methanol solution on slow evaporation. Thrombocytosin can be demonstrated in the readily soluble fraction and in crystals formed upon further evaporation.

Crude separation of the two mutually antagonistic factors may also be achieved by suspending the primary acetone-ether extract in saline solution and filtering. The milky dispersion which passed the filter was found to be rich in thrombocytosin. The material left on the filter formed a flocculent suspension in saline solution which was found to be rich in thrombocytopen.

In a few instances, in working with the separatory methods described above, discordant results were obtained which suggested imperfect separation of the two mutually antagonistic factors. A reliable differential extraction and separation procedure was established by the introduction of the step of emulsifying the extracts with alkali. The primary residue obtained by drying the acetone extract of ground spleen was shaken with ether, filtered and evaporated. The ether-soluble residue was shaken with an aqueous sodium hydroxide solution, acidified with a slight excess of hydrochloric acid and again extracted with ether. The product may be separated into two fractions exhibiting contrary effects on the blood platelet count by either of the procedures outlined above.

By following the foregoing procedures, crystalline fractions of surprising potency were secured, exhibiting marked thrombocytosin or thrombotopen activity in rabbits in doses of 5 milligrams. When injected intramuscularly into a rabbit the thrombocytopen fraction lowered the platelet count by some 100,000 platelets per cu. mm. With the thrombocytosin fraction, an elevation of the blood platelet count of the order of 200,000 to 300,000 platelets per cu. mm. was obtained in rabbits. The crystals of thrombocytosin are relatively long and delicate with a tendency to curve and "feather" whereas the crystals of thrombocytopen are relatively short and blunt. Both are colorless or water-white but thrombocytosin is much more soluble in methanol than thrombocytopen.

As an illustration of a presently preferred process for the differential recovery of the two mutually antagonistic myelotropic factors the following description of a particular extraction operation is given:

A ground bovine spleen was extracted with 5 volumes of reagent acetone for several days. At the end of this period the material was filtered and the acetone distilled off leaving a brownish gummy residue. This residue was shaken with ether, filtered, and the ether evaporated from the filtrate. The residue was shaken with aqueous sodium hydroxide just purple to phenophthalein and kept in a warm room from 12 to 15 hours, then acidified with a slight excess of hydrochloric acid and extracted with ether in a separatory funnel. The ethereal solution was evaporated to dryness, the residue was re-extracted with acetone, dried, and then dissolved in methyl alcohol and set aside at room temperature to evaporate slowly. As crystals formed on the side of the beaker the mother liquor was decanted for a similar period of evaporation into each of several other evaporating beakers in succession until only an amorphous product remained. In some cases recrystallization from methyl alcohol will be necessary in order to obtain colorless crystals. A low-power loupe was employed in grouping crystals of like type. It was found that the crystals could readily be classified by inspection into distinct groups. The crystals of each type were collected separately, dissolved in ether, dried and re-dissolved in acetone to make up separate doses of known amount for bioassay and added to 10 cc. quantities of sterile 0.85 saline solution. The acetone was distilled off in vacuo at 40° C. until no trace of its odor could be detected. The resulting cloudy or flocculent suspension was shaken thoroughly before injection.

Further purification was subsequently achieved when it was discovered that the crystalline material consisted largely of pure cholesterol upon which the active factors had become adsorbed. The procedure employed consisted in vigorous saponification in boiling alcoholic potassium hydroxide solution. When the mixture was permitted to stand overnight in the refrigerator following this treatment virtually all the cholesterol separated out as crystals. Bioassay of these crystals revealed their complete inactivity. The fatty acids were then removed by addition of barium chloride and they also showed absence of activity following their recovery from the insoluble barium soaps. The active concentrates were recovered from the residual clear solution by ether extraction.

When the raw material under treatment contains one of the factors in great preponderance over the other, as for example in the case of egg yolk, the steps of saponifying and eliminating cholesterol and fatty acids may advantageously be applied to the crude ether extract. In such case the step of separating the factors from each other may be omitted.

It was found that both factors are stable to prolonged heating and to exposure to alkali, air, light and drying. Consequently, powdered dried raw materials may be used as starting materials and such methods as continuous reflux extraction with boiling acetone or another suitable lipoid solvent in Soxhlet apparatus may be employed in preparing the extracts.

When an effective method for the separation of the two factors had been established, an extensive investigation of numerous types of animal tissues and other materials was undertaken to discover the content of each factor in these various materials. This investigation covered among other materials normal beef spleen, normal human spleen, and human spleen from various conditions including aplastic anemia, Hodgkins disease, and monocytic leukemia. The investigation also covered normal human liver, brain, lymph nodes, omentum, bone marrow, heart, subcutaneous fat and perirenal fat (cases of accidental or sudden death), and also egg yolk, peanut oil, butter and soap.

The relative concentration of each factor in the various materials investigated was calculated from the results of bioassays, employing as the unit of comparison the dosage of concentrate from which cholesterol had not been eliminated required to produce a peak increase or decrease of 100,000 platelets per cu. mm. upon intramuscular injection in rabbits. The results are given in Table I which follows. It is pointed out that the results given in this tabulation are not to be regarded as definitive as to quantitative values in all cases. They may be inaccurate and incomplete for several reasons, including incompleteness of some of the extractions, differences in reactivity of the test animals, and in some cases, in earlier experiments, imperfect separation of the two factors. However, the results serve to suggest the most useful sources for the two factors.

*Table I*

| Assay Material | Thrombocytopen (units/gram) | Thrombocytosin (units/gram) |
|---|---|---|
| Normal human spleen (4 cases) | 0.70± | 0.24 |
| Normal beef spleens (pooled) | 0.35 | 0.25 |
| Spleen, Hodgkin's disease (2 cases) | 0.0–0.16 | 0.07–1.6 |
| Spleen, aplastic anemia, hemosiderosis | 0.14 | 0.11 |
| Spleen, monocytic leukemia | 0.007 | 0.003 |
| Spleen, Purpura Hemorrhagica | 7.0+ | |
| Brain tissue | 0.0 | 0.006 |
| Liver | 0.0 | 0.0006 |
| Lymph node | 0.0 | ? |
| Bone marrow | | 6.1 |
| Subcutaneous fat | 0.0 | 0.0 |
| Perirenal fat | 0.0 | 2.0 |
| Peanut oil | 0.0 | 0.0 |
| Egg yolk | 0.1+ | 1.6± |

Preliminary assays of lymph nodes gave equivocal results for thrombocytopen but demonstrated thrombocytosin in great abundance. Egg yolk proved rich in both thrombocytopen and thrombocytosin; the proportions, however, were not consistently uniform, in most tests the injected crude primary acetone-ether extracts exerted a thrombocytosin effect predominantly. This was true also on oral administration. Thrombocytosin was also found in large amounts in the urine following splenectomy.

The physiological effects of the two factors were investigated by intramuscular injection into rabbits of extracts prepared according to the preferred procedure described above, but without elimination of cholesterol. The thrombocytopen produced a fall in thrombocyte count roughly proportional to the doses given within certain limits although after prolonged administration for several days in large doses, a refractory state and "platelet escape" occurred and the bone marrow revealed a remarkable hyperplasia of megakaryocytes in various stages of maturation. In contrast, thrombocytosin upon injection into rabbits produced maximal effects, or nearly maximal effects, in doses of 5 mgm. The effects of this dosage approximated the effects of doses of 20 mgm. or more, suggesting the action of protective mechanisms.

Rabbits were found to differ moderately in their respective sensitivity to each factor.

No evidences of toxicity were detected in rabbits with physiologically effective doses given repeatedly on alternate or successive days for periods of a week or longer. There were no significant changes in erythrocyte or leukocyte count. Purpura was not observed in any of the experiments with thrombocytopen, although prolongation of bleeding time persisted for weeks following a large dose in peanut oil in one case.

Excessive agglutination of platelets and clotting of blood in the counting pipette occurred in some experiments with thrombocytosin at or near the peak of thrombocyte rise. No thromboses were observed.

Sensitivity to each factor was preserved undiminished after repeated tests with single doses extending over a considerable period. One of the rabbits received 26 injections in four and one-half months and another received 31 injections and 10 oral doses in the same period.

It appears from my experiments that the concentrates of spleen extract which have previously been prepared and reported in the literature probably contained both the thrombocytopen and the thrombocytosin factors. The presence of both factors in the extract was obscured by the dominance, in physiological effect, of the thrombocytopen factor. The presence of both factors in these earlier acetone extracts of spleen would account for the conflicting and paradoxical results reported. No separation of the two factors had heretofore been made and the existence of the thrombocytosin factor had not been recognized.

The results of the present discovery sheds further light on the physiological role of the spleen. The findings given in Table I suggest tentatively that in the human organism significant amounts of both thrombocytopen and thrombocytosin occur in the spleen, diminishing in amount with metaplasia or replacement of its functioning reticulo-endothelial elements (hemosiderosis, Hodgkin's disease, leukemia). The marked excess of thrombocytopen and the histologic findings in the spleen of chronic purpura support the concept of hypersplenism as its basis.

It would appear that the spleen exerts a dual control on the rate of delivery of thrombocytes into the circulating blood. The relative ineffectiveness of increased dosage of thrombocytosin above a relatively narrow range and its high level of excretion in the urine following splenectomy indicate the significant role of the spleen in inactivating surpluses absorbed from the diet. The high concentration of thrombocytosin in spleen and in lymph nodes and its virtual absence from liver, brain and other tissues tested suggest its selective accumulation within the cells of the general reticulo-endothelial system as the preliminary stage in its inactivation.

The relatively great physiological potency of the concentrates made available by the present invention suggested their application for therapeutic purposes.

Two human patients with advanced leukemia and thrombocytopenia were treated by oral administration of thrombocytosin prepared from egg yolk without elimination of cholesterol, in dosages of the extract from five egg yolks daily. Neither patient suffered any impairment of appetite or other observable ill effect, and both displayed an elevation in thrombocyte count almost to the normal level coincident with the period of treatment.

It will be appreciated that the invention in its process aspects is not confined to the details of the procedures and reagents described herein. Processes have been described in detail for the purpose of disclosure and by way of illustration rather than limitation. Thus, the primary extraction of the raw animal material which has been described as performed with acetone may be carried out with other equivalent water-miscible lipoid solvents among which may be mentioned methyl ethyl ketone, pyridine and methyl alcohol, or mixtures of such solvents. Likewise, the step of eliminating cholesterol from the concentrate may be effected in any suitable manner.

I claim:

1. The process of preparing in concentrated form a biologically active factor capable of increasing the blood platelet count in the living animal which comprises extracting with acetone an animal material known to contain such biologically active factor in substantial proportion, recovering the extract, evaporating the acetone therefrom and subsequently treating the materials contained in the resulting residue with ether and alkali to eliminate therefrom any free fatty acids and substances that are insoluble in ether, dissolving the remaining materials in methyl alcohol, subjecting the alcohol solution to controlled evaporation to effect a partial crystallization, separating the crystals thus formed and thereafter recovering the desired blood platelet count increasing factor contained in the residual alcoholic liquor.

2. The process of preparing in concentrated form a biologically active factor capable of increasing the blood platelet count in the living animal which comprises subjecting an animal material known to contain such biologically active factor in substantial proportion in association with cholesterol to the extractive action of a water-miscible lipoid solvent, separating the resulting extract from the insoluble residue, then distilling off the said solvent and extracting the residue with ether, then filtering the ether extract and evaporating the ether therefrom, then subjecting the ether extract residue to a mild saponification to saponify any free fatty acids present, then acidifying and re-extracting with ether, then evaporating the solution to dryness, and thereafter separating said factor from any blood platelet count decreasing factor present in said residue by dissolving the residue in methyl alcohol and subjecting the methyl alcohol solution to controlled evaporation, whereby the less soluble blood platelet count decreasing factor is preferentially adsorbed on to the cholesterol crystals thrown down during the earlier stages of the evaporation, and thereafter recovering the blood platelet increasing factor in admixture with the remaining cholesterol contained in said residue.

3. The process of separating and recovering in concentrated form the biologically active factors that are capable of influencing positively and negatively the blood platelet count in the living animal which comprises subjecting an animal material known to contain both of said biologically active factors in substantial proportion to the extractive action of a water-miscible lipoid solvent, separating the resulting extract from the insoluble residue, thereafter evaporating said solvent and treating the materials contained in the resulting residue with ether and alkali to eliminate therefrom any free fatty acids and substances that are insoluble in ether, dissolving the remaining materials in methyl alcohol and finally fractionally separating said factors from their solution in methyl alcohol.

4. The process of separating and recovering in concentrated form the biologically active factors that are capable of influencing positively and negatively the blood platelet count in the living animal which comprises subjecting an animal material known to contain both of said biologically active factors in substantial proportion to the extractive action of a water-miscible lipoid solvent, separating the resulting extract from the insoluble residue, thereafter evaporating said solvent and treating the materials contained in the resulting residue with ether and alkali to eliminate therefrom any free fatty acids and substances that are insoluble in ether, and finally separating said factors by preferential adsorption on cholesterol under conditions promoting gradual crystallization of the cholesterol from methyl alcohol.

5. A process for preparing a biologically active material adapted to increase the blood platelet count of a living animal which comprises subjecting an animal material containing such biologically active material to the extractive action of a water-miscible lipoid solvent, separating the extract thus produced from insolubles, eliminating the solvent from such extract, forming an ethereal extract from the residue of said first extract, separating the ether-soluble material from the ether-insoluble material, recovering said biologically active material from said ether-soluble material and separating the blood platelet increasing material from the blood platelet decreasing material by fractional crystallization from methanol.

6. A process for preparing a biologically active material adapted to increase the blood platelet count of a living animal which comprises extracting bovine spleen with acetone, removing insolubles, removing the acetone from the acetone extract thus produced to form a residue, preparing an ether extract from said residue, evaporating the ether from the ethereal extract to recover the biologically active material and separating the blood platelet increasing material from the blood platelet decreasing material by fractional crystallization from methanol.

7. A process for preparing a biologically active material adapted to increase the blood platelet count of a living animal which comprises extracting subcutaneous animal fat with acetone, separating the liquid extract thus produced from insolubles, distilling off the acetone to produce a residue, extracting said residue with ether to form an ether solution, separating the ether solution from ether-insoluble matter, evaporating the ethereal solvent to produce a residue, shaking such residue with aqueous caustic soda and then extracting the same with ether to produce a second ether solution, separating the second ether solution from ether-insoluble matter, evaporating the second ether solution to dryness, extracting the residue thus produced with acetone, separating the acetone-soluble material from insolubles, drying the acetone extract thus formed, dissolving it in methanol and evaporating the methanol solution slowly at room temperature to produce crystalline thrombocytosin.

8. A process for preparing a biologically active material adapted to increase the blood platelet count of a living animal which comprises extracting egg yolks with acetone, separating the liquid extract thus produced from insolubles, distilling off the acetone to produce a residue, extracting said residue with ether to form an ether solution, separating the ether solution from ether-insoluble matter, evaporating the ethereal solvent to produce a residue, shaking such residue with aqueous caustic soda and then extracting the same with ether to produce a second ether solution, separating the second ether solution from ether-insoluble matter, evaporating the second ether solution to dryness, extracting the residue thus produced with acetone, separating the acetone-soluble material from insolubles, drying the acetone extract thus formed, dissolving it in methanol and evaporating the methanol solution slowly at room temperature to produce crystalline thrombocytosin.

SYLVAN E. MOOLTEN.

(References on following page)

REFERENCES CITED

The following references are of record in the file of this patent:

UNITED STATES PATENTS

| Number | Name | Date |
|---|---|---|
| 1,314,321 | Fraenkel et al. | Aug. 26, 1919 |
| 1,437,951 | Archibald | Dec. 5, 1922 |
| 1,796,027 | Iscovesco | Mar. 10, 1931 |
| 1,916,478 | Hohlweg | July 4, 1933 |
| 2,171,320 | Lautenschlager et al. | Aug. 29, 1939 |

OTHER REFERENCES

Suto-Nagy, J. Biol. Chem., December 1944, pages 433 to 441.